US008522243B2

(12) United States Patent
Ventroux et al.

(10) Patent No.: US 8,522,243 B2
(45) Date of Patent: Aug. 27, 2013

(54) METHOD FOR CONFIGURING RESOURCES AND SCHEDULING TASK PROCESSING WITH AN ORDER OF PRECEDENCE

(75) Inventors: Nicolas Ventroux, Bures-sur-Yvette (FR); Stéphane Chevobbe, Paris (FR); Frédéric Blanc, Velizy (FR); Thierry Collette, Palaiseau (FR)

(73) Assignee: Commissariat a l'Energie Atomique, Paris (FR)

( * ) Notice: Subject to any disclaimer, the term of this patent is extended or adjusted under 35 U.S.C. 154(b) by 957 days.

(21) Appl. No.: 11/658,935

(22) PCT Filed: Jul. 28, 2005

(86) PCT No.: PCT/FR2005/050626
§ 371 (c)(1),
(2), (4) Date: Feb. 12, 2008

(87) PCT Pub. No.: WO2006/021713
PCT Pub. Date: Mar. 2, 2006

(65) Prior Publication Data
US 2008/0263555 A1     Oct. 23, 2008

(30) Foreign Application Priority Data
Jul. 30, 2004  (FR) .................................. 04 51743

(51) Int. Cl.
*G06F 9/46* (2006.01)
(52) U.S. Cl.
USPC .......................................... 718/103; 718/104
(58) Field of Classification Search
USPC ......................................................... 718/103
See application file for complete search history.

(56) References Cited

U.S. PATENT DOCUMENTS

| 5,506,987 | A | * | 4/1996 | Abramson et al. | ............ 718/103 |
| 5,826,080 | A | | 10/1998 | Dworzecki | ................... 395/673 |
| 6,240,502 | B1 | * | 5/2001 | Panwar et al. | .................. 712/15 |
| 6,571,215 | B1 | * | 5/2003 | Mahapatro | ................... 705/7.12 |

(Continued)

FOREIGN PATENT DOCUMENTS
EP          0697656 A1    2/1996
WO     WO 01/18683 A2    3/2001

OTHER PUBLICATIONS

Hanos Csirik & Gerhard J. Woeginger, On-line Packing and Covering Problems, Published 1998.*
Search Report, PCT/FR2005/050626, 4 pgs., (Jul. 30, 2004).

(Continued)

*Primary Examiner* — Meng An
*Assistant Examiner* — Blake Kumabe
(74) *Attorney, Agent, or Firm* — Nixon Peabody LLP (57) ABSTRACT

The invention relates to a method for scheduling the processing of tasks and to the associated device, the processing of a task comprising a step for configuring resources required for executing the task and a step for executing the task on the thereby configured resources, the method comprising a selection (1) of at least one level of independent tasks to be processed in accordance with an order of precedence and a step for sorting (2) out the tasks of the level of tasks to be processed in order to define, an order of priority in the processing of the tasks, depending on the number of resources required for processing the tasks on the one hand and on a time characteristic of the tasks on the other hand.

8 Claims, 6 Drawing Sheets

(56) References Cited

U.S. PATENT DOCUMENTS

| | | | | |
|---|---|---|---|---|
| 7,386,481 | B2* | 6/2008 | Aronsson et al. | 705/26.35 |
| 7,430,557 | B1* | 9/2008 | Loboz et al. | 1/1 |
| 7,725,900 | B2* | 5/2010 | Sauermann | 718/105 |
| 2003/0084088 | A1 | 5/2003 | Shaffer | 709/104 |
| 2004/0054997 | A1* | 3/2004 | Katragadda et al. | 718/102 |

OTHER PUBLICATIONS

Ramamritham, Krithi, "Allocation and Scheduling of Precedence-Related Periodic Tasks" IEEE Transactions on Parallel and Distributed Systems, "Online", vol. 6, No. 4 (Apr. 1995), pp. 412-420, XP-002330128, URL:http://ieeexplore.ieee.org/iel4/71/8537/00372795.pdf?arnumber=372795> 'extrait le May 31, 2005!

Bizzarri, Paolo et al., "A Scheduling Algorithm for Aperiodic Groups of Tasks in Distributed Real-Time Systems and Its Holistic Analysis", Distributed Computing Systems, 1997, Proceedings of The Sixth IEEE Computer Society Workshop on Future Trends of Tunis, Tunisia, Los Alamitos, CA, USA, IEEE Computer, Soc, US, (Oct. 29, 1997), pp. 296-301, XP 010261209, ISBN: 0-8186-8153-5.

Belkhale, Krishna P., "Approximate Algorithms for the Partitionable Independent Task Scheduling Problem", 1990 International Conference on Parallel Processing, Center for Reliable and High-Performance Computing Coordinated Science Laboratory, University of Illinois, Urbana, IL-61801, pp. I-72-I-75.

Baer, J. L., "A Survey of Some Theoretical Aspects of Multiprocessing", University of Washington, Seattle, Washington 98195, Computing Surveys, vol. 5, No. 1, pp. 31-80, (Mar. 1973).

Blażewicz, Jacek et al., "Scheduling Multiprocessor Tasks to Minimize Schedule Length", pp. 389-393, IEEE Transactions on Computers, vol. c-35, No. 5, (May 1986).

Baker, Brenda S., et al., "A 5/4 Algorithm for Two-Dimensional Packing", Journal of Algorithms 2, pp. 348-368, (1981).

Topcuoglu, Haluk, "Performance-Effective and Low-Complexity Task Scheduling for Heterogeneous Computing", IEEE Transactions on Parallel and Distribute Systems, vol. 13, No. 3, (Mar. 2002) pp. 260-274.

Ibaraki, Toshihide et al., "Resource Allocation Problems" Algorithmic Approaches, Foundations of Computing Series, 6 pgs., (Feb. 4, 1992).

Peterson, James L., "Petri Net Theory and The Modeling of Systems", 5 pgs, (1981).

Li, Kegin, "Probabilistic Analysis of Scheduling Precedence Constrained Parallel Tasks on Multicomputers With Contiguous Processor Allocation", IEEE Transactions on Computers, vol. 49, No. 10, pp. 1021-1030, 2000.

Jansen, Klaus, "Improved Approximation Schemes for Scheduling Unrelated Parallel Machines", pp. 408-417, (1999).

* cited by examiner

METHOD FOR CONFIGURING RESOURCES AND SCHEDULING TASK PROCESSING WITH AN ORDER OF PRECEDENCE

CROSS REFERENCE TO RELATED APPLICATIONS OR PRIORITY CLAIM

This application is a national phase of International Application No. PCT/FR2005/050626 entitled "Task Processing Scheduling Method And Device For Implementing Same", which was filed on Jul. 28, 2005, which was not published in English, and which claims priority of the French Patent Application No. 04 51743 filed Jul. 30, 2004.

TECHNICAL FIELD AND PRIOR ART

The invention relates to a method for scheduling the processing of tasks as well as to a device for applying the method. The invention also relates to a task processing method as well as to the associated device.

The invention is applied in a very large number of fields such as, for example, in the field of on-board electronics (mobile telephony, automotive industry, aeronautics, etc.) or even in the field of complex distributed electronics systems intended for intensive calculations such as supercomputers.

Today, on-board electronics must meet increasingly strong demands in terms of flexibility and performance. For example, in the field of multimedia applications (cellular telephones, portable computers, etc.), non-specialized processors are no longer sufficient by themselves to meet newly imposed constraints.

Systems composed of several specialized processors, with reconfigurable blocks, with memories, etc., have thus appeared and given rise to the emergence of an on-chip integrated technology more commonly called a Systems-on-Chip (SoC) technology. To improve performances and flexibility of the SoC technology, communication networks were integrated within chips in order to interconnect the different components which are integrated on the chips. These network systems on chips, commonly called Network-on-Chip (NoC), today provide a solution suitable for integrating future technologies. Nevertheless, the handling of parallelism of tasks and optimum execution of applications remain major problems to be solved on these networks.

Task scheduling algorithms are widely represented in the literature. The algorithms processing non-dynamically parallelizable tasks (the number of processors is known before compilation) and the scheduling of which is based on lists of sorted tasks, are the object of the invention. Other solutions, such as, for example, genetic algorithms, are more performing and better results may be achieved with them. However, these more performing solutions are too complex to be applicable on silicon and their interest remains limited within the scope of the invention.

Blazewicz and his team have provided an interesting solution for determining the exact solutions in the case when all the tasks have the same execution time (cf. bibliographic reference [BLAZ86]) Nevertheless, the required algorithm generates significant computing time as well as significant exchanges of data.

Jansen and his team as for them have considered the scheduling of independent tasks which may execute on only a single processor (cf. bibliographic reference [JANS99]). They have provided a solution of polynomial complexity, therefore of low mathematical complexity. This having been stated, a study on its physical implementation reveals a too complex application for obtaining good performances.

Similar conclusions are verified in works closer to the problems of the invention (cf. bibliographic references [BAER73, BAKE81]). Other solutions require the possibility of evaluating the times left for executing the tasks (cf. bibliographic reference [TOPC02] and U.S. Pat. No. 6,567,840 B1). But this cannot be contemplated for asynchronous systems and dynamical scheduling consumes an enormous amount of power since it requires continuous updates.

Other results have also shown that sorting out tasks according to the number of useful resources proves to be particularly interesting in terms of complexity and resulting execution times [cf. bibliographic references LI00 and IBAR88]. For allocating tasks on the resources, the main innovation presented in the literature consists of dynamically changing the number of resources useful for task execution. However, this cannot be contemplated within the scope of a physical solution since compilation of a task is dependent on the number of required resources.

DISCUSSION OF THE INVENTION

The task processing scheduling algorithm according to the invention does not have the aforementioned drawbacks.

The invention relates to a scheduling method for processing tasks, the execution of which is conditioned by an order of precedence, the processing of a task comprising a step for configuring the resources required for executing the task and a step for executing the task on the thereby configured resources. The method is characterized in that it comprises:

a selection of at least one level of tasks to be processed,
a step for sorting the tasks of the level of tasks to be processed, in order to define, in accordance with the order of precedence, an order of priority in the processing of the tasks, depending on the number of resources required for processing the tasks on the one hand and, on a characteristic quantity of the tasks on the other hand,
an evaluation of the number of available resources for processing the tasks on the task level, and
an assignment of the tasks of the task level to available resources according to the order of priority.

According to a further feature of the invention, the sorting step comprises a first sorting according to the number of resources required for executing the tasks so that the tasks are processed according to a decreasing order of the number of resources required for their processing on the one hand and, a second sorting according to the characteristic quantity of the tasks so that the tasks are processed according to an increasing or decreasing order of their characteristic quantity, on the other hand.

According to a first alternative of the invention, the first sorting precedes the second sorting, the second sorting being applied as soon as the number of resources required for processing several tasks is identical for said several tasks.

According to a second alternative of the invention, the second sorting precedes the first sorting, the first sorting being applied as soon as the characteristic quantity of the tasks relative to several tasks is identical for said several tasks.

According to a further feature of the invention, the characteristic quantity of the tasks is the time for processing the tasks, or the time for configuring resources required for executing the tasks, or the time for executing the tasks, or a time which is left to a task for executing depending on an execution time constraint associated with the task, or the processing, configuration or execution time of one or more tasks of upper rank in the order of precedence of the tasks, or a latest end date for configuring the tasks or executing the tasks, or an earliest or latest start date for configuring or executing one or several tasks of upper rank in the order of precedence of the tasks, or a time depending on a periodicity relative to one or several tasks, or a time depending on the whole or part of the characteristic quantities listed above.

According to still a further feature of the invention, the characteristic quantity of the tasks is a passband width useful for executing tasks, or an arrival rate of data processed by the tasks, or a number of resources useful for storing or for communicating data processed by the tasks, or a cost for communicating with other tasks or with resources shared among the tasks, or a power consumption generated by the processing of the tasks, or a piece of information which measures the complexity of the operations associated with the execution of the tasks, or a piece of information which measures the regularity of an algorithm associated with the execution of the tasks, or a piece of information which measures the parallelism of execution of the tasks, or a piece of information which measures an independent priority of the tasks and imposed by a user in the case of multi-user use, or a function of the whole or part of the characteristic quantities listed above.

According to still a further feature of the invention, the characteristic quantity of the tasks is a piece of information relating to the position of the tasks in an application graph.

According to still a further feature of the invention, the piece of information relating to the position of the tasks in an application graph is the time left to the tasks for executing before the end of a time constraint imposed on the processing time of the application graph, or the largest number of tasks which remain to be processed before the end of the application graph, or the largest number of tasks of upper rank in the order of precedence of the tasks, or the sum of the execution times of the tasks of upper rank in the order of precedence of the tasks, or a function of the whole or part of the quantities listed above.

According to still a further feature of the invention, the task level is defined by validating task precedence constraints at task level.

According to still a further feature of the invention, assignment of the available resources according to the order of priority is dynamically repeated until all the tasks of the task level are processed.

According to still a further feature of the invention, processing of a task level of rank G begins as soon as all the tasks of the task level of rank G-1 which precedes the task level of rank G have been configured.

The invention also relates to a method for processing tasks, the execution of which is conditioned by an order of precedence, the processing of a task comprising a step for configuring the resources required for executing the task and a step for executing the task on the thereby configured resources. The processing method is characterized in that it comprises a scheduling of the processing of the tasks according to the method of the invention and in that the configuration of the resources and the execution of the tasks are activated by a configuration token and by an execution token, respectively.

The invention also relates to a device for scheduling the processing of tasks, the execution of which is conditioned by an order of precedence, the processing of a task comprising a step for configuring the resources required for executing the task and a step for executing the task on the thereby configured resources. The device is characterized in that it comprises:
- a component which contains a set of tasks to be processed,
- a selection block for selecting at least one level of tasks to be processed among the set of tasks contained in the component,
- means for sorting the tasks at the selected task level according to an order of priority so that, in accordance with the order of precedence, the tasks are processed depending on the number of resources required for processing the tasks on the one hand, and on a characteristic quantity of the tasks on the other hand, and
- means for assigning the available resources to the processing of the tasks depending on the order of priority.

According to a further feature of the invention, the means for sorting the tasks of a selected task level comprise:
- a first memory block containing information representative of the number of resources required for processing each task,
- a second memory block containing information representative of characteristic quantities of the tasks,
- first comparison means for comparing the pieces of information with each other, representative of the characteristic quantities of the tasks at the task level,
- second comparison means for comparing the number of available resources with the number of resources required for processing the tasks at the task level, and
- means for establishing the order of priority depending on the comparison results delivered by the first and second comparison means.

According to a further feature of the invention, the means for establishing the order of priority depending on the comparison results comprise a set of shift registers containing binary data.

According to a further feature of the invention, the component which contains the set of tasks to be processed is a reconfigurable component suitable for control, which comprises N+1 cells representing N+1 states of a graph for applying tasks to be executed, each cell containing a task to be executed, and a reconfigurable interconnection network for connecting the different states of the graph to each other.

According to a further feature of the invention, the block for selecting tasks comprises means for rejecting the processing of one or several tasks at the level of tasks to be processed in order to allow degraded operation of the system in order to observe environmental conditions, such as for example a maximum available energy or power, a time constraint imposed on the task level, a constraint on the availability of the computing, storage or communication resources, or a constraint of electromagnetic compatibility with the external medium, or the whole or part of the conditions listed above.

The invention also relates to a device for processing tasks, characterized in that it comprises a device for scheduling tasks according to the invention containing a reconfigurable component suitable for control, a configuration token and an execution token traveling along the interconnection network in order to activate configuration of the tasks and execution of the tasks, respectively.

With the method for scheduling processing of tasks according to the invention it is possible to very substantially increase the performances of the scheduling of independent tasks. The device for applying the method of the invention consists of several entities. The tasks to be executed are non-preemptive (i.e. they cannot be interrupted), non-malleable (i.e. the number of resources useful for their execution is known beforehand) tasks, with known execution times and characteristic quantity.

The scheduling method according to the invention promotes contiguous allocation of resources for processing a same task. It minimizes the total execution time of the tasks and promotes occupation of the resources.

The scheduling method according to the invention dynamically handles the allocation and the release of the computing resources and allows the resources to self-adapt depending on the needs. It allows configuration of the resources before their execution while taking into account precedence constraints, and this for systems consisting of any number of identical or heterogeneous resources. By heterogeneous resources is meant resources of different nature (memories, microprocessors, reconfigurable blocks, IP (Intellectual Property), interfaces, buses, etc.).

SHORT DESCRIPTION OF THE FIGURES

Other features and advantages of the invention will become apparent upon reading a preferential embodiment made with reference to the appended figures, wherein.

In all the figures, the same marks designate the same components.

DETAILED DESCRIPTION OF EMBODIMENTS OF THE INVENTION

Figure 1:
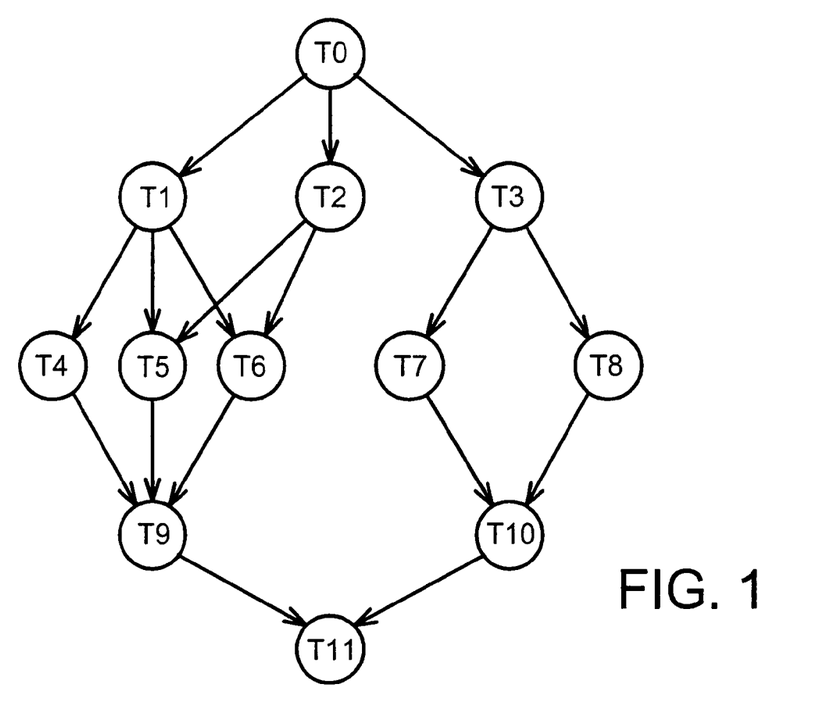
FIG. 1, illustrates an example of a task application graph.

FIG. 1 illustrates an exemplary application graph for tasks to be executed. The nodes illustrate the tasks and the arrows connecting the nodes symbolize the order or precedence in which the tasks should be executed.

Before applying the method, the following information is known:
- the order of precedence in which the tasks should be executed (cf. below),
- the total number of computing resources available for processing the tasks,
- the number of computing resources required for processing each task,
- the time required for processing each task.

By <<the time required for processing a task>>, is meant a time equal to the sum of the time for configuring the resources which should contribute to executing the task and of the execution time of the task on the thereby configured resources. The time for configuring the resources is the time during which the operations which are required for executing the task are configured in the resources.

The tasks are executed level by level. Precedence constraints condition the definition of the levels of the tasks as well as the application of the execution of the tasks within a same level.

The order of precedence of the twelve tasks T0-T11 to be processed is here the following:
- task T0 should be executed before tasks T1, T2 and T3,
- task T1 should be executed before tasks T4, T5 and T6,
- task T2 should be executed before tasks T5, and T6,
- task T3 should be executed before tasks T7, and T8,
- each of the tasks T4, T5 and T6 should be executed before task T9,
- each of the tasks T7 and T8 should be executed before task T10,
- tasks T9 and T10 should be executed before task T11.

In a general way, for a given application graph, a level of tasks of rank G comprises all the tasks for which the beginning of the execution directly depends on the end of the execution of the tasks of the preceding task level of rank G-1.

In the selected example of FIG. 1, there are therefore five successive task levels, i.e.:
- level N0 which comprises the task T0,
- level N1 which comprises the tasks T1, T2, T3,
- level N2 which comprises the tasks T4, T5, T6, T7, T8,
- level N3 which comprises the tasks T9 and T10, and
- level N4 which comprises the task T11.

In the following description, for reasons of simplification, a task will be said to be a <<parent task>> relatively to one or more so-called <<child task(s)>>, when the execution of the child task(s) directly depends on completion of the execution of the parent task. As a non-limiting example, task T1 is thus a parent task for the three child tasks T4, T5, T6 and task T2 is also a parent task for both child tasks T5 and T6.

Figure 2:
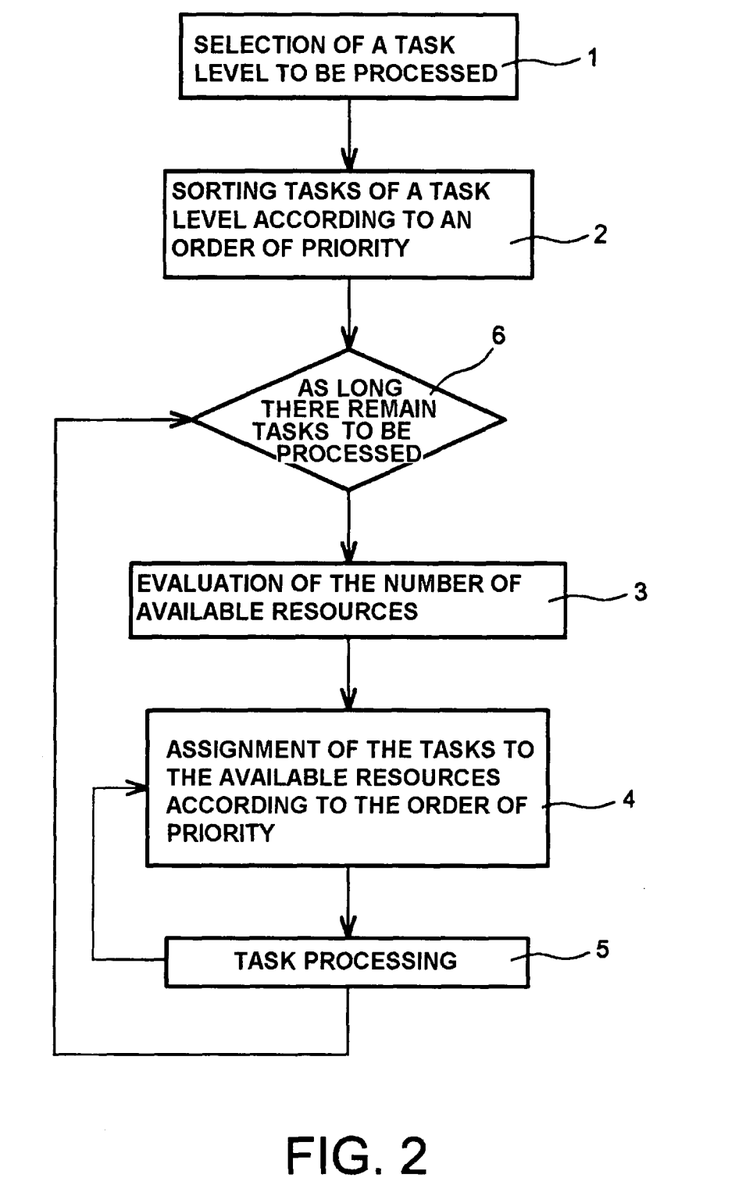
FIG. 2 illustrates a flow chart of the scheduling principle for processing a level of tasks according to the invention.

FIG. 2 illustrates a flow chart of the principle of the scheduling method for a level of tasks according to the invention.

A first step of the method consists of selecting a level of tasks to be processed according to the order of precedence of the tasks (step 1). Once the task level is selected, the tasks of the task level are sorted out in order to establish an order of priority for processing the tasks (step 2).

According to the preferential embodiment of the invention, during the sorting step, the tasks are first of all sorted out by decreasing order of the number of resources required for their execution and, if the number of resources is identical among several tasks, the latter are then sorted out by decreasing order of the their processing time (as mentioned above, the time for processing a task is the sum of the time for configuring the resources affected to the task and of the execution time of the task on the configured resources). The thereby defined order of priority gives preference to the processing of the task or of the tasks which use the most resources and, with identical numbers of resources, the task which requires the longest processing time.

Other embodiments of the invention are also possible. The sorting according to the processing time of the tasks may thus precede the sorting according to the number of resources. Processing of the task(s) with the longest time(s) is then preferred and, for identical times, of the task which uses the most resources.

Other sorting criteria, according to other characteristic quantities of the tasks to be processed, may also be used within the scope of the invention.

In addition to the time for processing the tasks, the characteristic quantity of the tasks may be the time for configuring the resources required for executing the tasks, or the time for executing the tasks, or a time which is left to a task for executing depending on an execution time constraint associated with the task, or the processing, configuration or execution time of one or several tasks of upper rank in the order of precedence of the tasks, or a latest end date for the configuration of the tasks or for the execution of the tasks, or an earliest or latest start date for configuring or executing one or more tasks of upper rank in the order of precedence of the tasks, or a time depending on a periodicity relatively to one or several tasks, or a time depending on the whole or part of the characteristic quantities listed above.

The characteristic quantity of the tasks may also be a passband width useful for executing the task, or an arrival rate of data processed by the tasks, or a number of resources useful for storing or communicating data processed by the tasks, or a cost for communicating with other tasks or with resources shared among the tasks, or a power consumption generated by the processing of the tasks, or a piece of information which measures the complexity of the operations associated with executing the tasks, or a piece of information which measures the regularity of an algorithm associated with executing the tasks, or a piece of information which measures the parallelism of execution of the tasks, or a piece of information which measures a priority independent of the tasks and imposed by a user in the case of multi-user use, or a function of the whole or part of the characteristic quantities listed above.

The characteristic quantity of the tasks may also be a piece of information relating to the position of the tasks in an application graph. The piece of information relating to the position of the tasks in the application graph may then be the time which is left to the tasks for executing before the end of a time constraint imposed on the processing time of the application graph, or the largest number of tasks which remain to be processed before the end of the application graph, or the largest number of tasks of upper rank in the order of precedence of the tasks, or the sum of the execution times of the tasks of upper rank in the order of precedence of the tasks, or a function of the whole or part of the quantities listed above.

Once the tasks are sorted out by order of priority, the number of available resources is evaluated (step 3). The tasks are then assigned to the available resources, for their processing, according to the order of priority as established earlier (step 4). Processing of the tasks is then executed (step 5). The steps for evaluating the number of available resources, for assigning the tasks to the available resources and for processing the tasks are repeated as long as there remains tasks to be processed (6). The mechanism for dynamically assigning the tasks is also repeated until all the tasks of the level have be processed (return from step 5 to step 4).

The implementation of the invention for a task application graph such as the graph illustrated in FIG. 1 will now be described.

Within the scope of the invention, the total number of resources for processing tasks is limited. As a non-limiting example, the number Ri of resources required for executing the tasks Ti (i=0, 2, . . . , 11) may be illustrated by the following table:

| Ti | Ri |
|---|---|
| T0 | 1 |
| T1 | 4 |
| T2 | 1 |
| T3 | 3 |
| T4 | 1 |
| T5 | 4 |
| T6 | 1 |
| T7 | 2 |
| T8 | 1 |
| T9 | 1 |
| T10 | 3 |
| T11 | 2 |

In the subsequent description, the notation <<configTi>> represents the time for configuring resources which should execute the task Ti and the notation <<execTi>> represents the time for executing the task Ti on the thereby configured resources. The <<execTi>> time therefore follows the (<configTi>> time.

Figure 3:
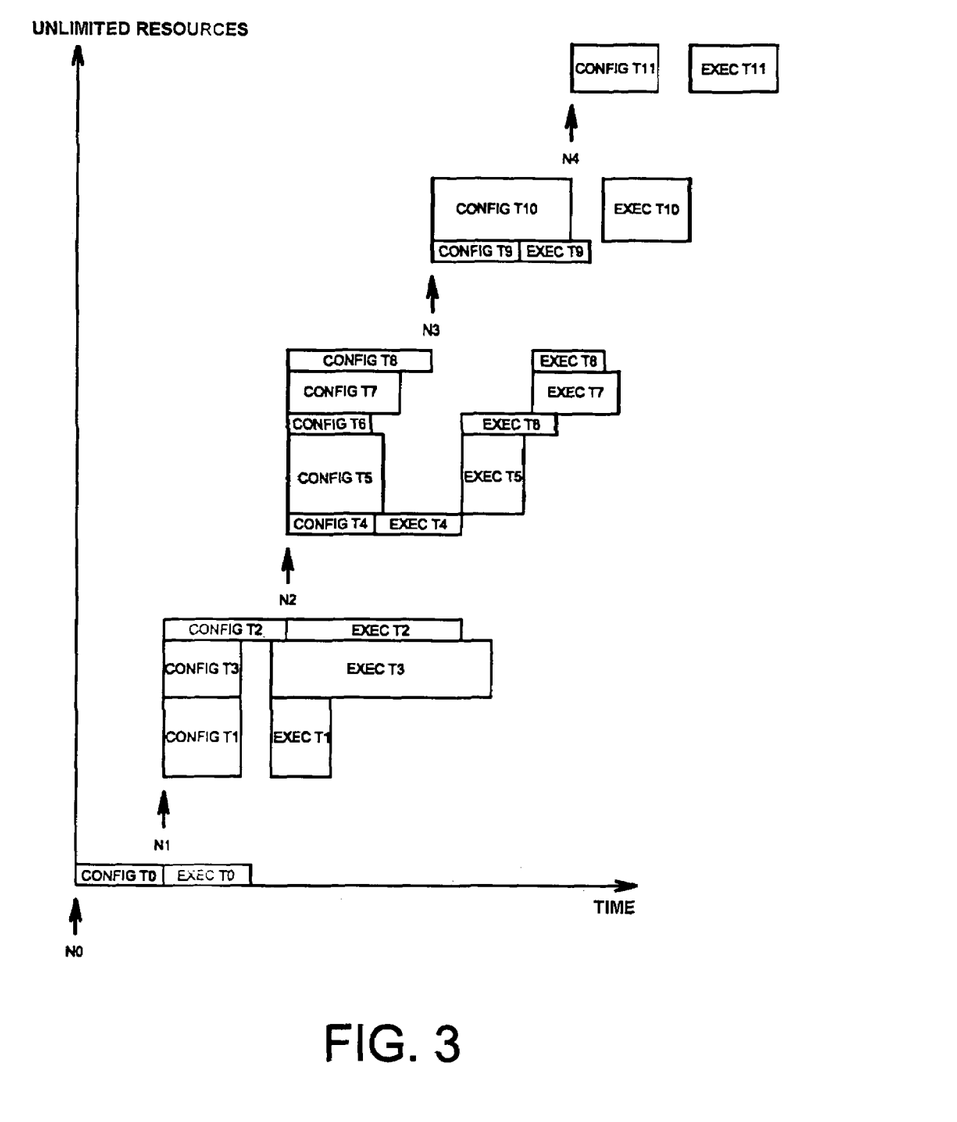
FIG. 3 illustrates a scheduling example for processing tasks in the case when the number of resources for processing the tasks is unlimited.

FIG. 3 illustrates an exemplary scheduling of tasks in the case when the number of resources for processing the tasks is unlimited. The scheduling of the tasks according to the example of FIG. 3 is therefore not included in the scope of the invention. This example is mentioned only didactically in order to illustrate in an ideal case, the structure which exists between the configuration steps and the steps for executing the tasks.

Task T0 is the first task to be executed and itself represents a first level N0 of tasks. The resource intended to execute the task T0 is then configured during the <<configT0>> time and, when the configuration is completed, the task is executed on the resource for the <<execT0>> time.

When the <<configT0>> time has ended, precedence constraints of the tasks T1, T2, T3 which form the second level N1 of tasks, are validated. As the number of resources is unlimited, the resources required for executing the tasks T1, T2 and T3 are then configured, in parallel, during the respective <<configT1>>, <<configT2>>, <<configT3>> times on as many resources as required. As soon as the <<execT0>> time has ended, execution of the tasks begins, for which tasks the resources are not occupied by the configuration operation. In this case, according to the selected example, the <<execT1>> and <<execT3>> times begin in parallel whereas the <<execT2>> time only begins when the <<configT2>> time has ended.

Simultaneously upon ending of the configuration time of the task T2 (last task of level N1), precedence constraints of the tasks T4, T5, T6, T7 and T8 which form the third level N2 of tasks, are validated. The resources required for executing the tasks T4, T5, T6, T7 and T8 are then configured. The <<configT4>>, <<configT5>>, <<configT6>>, <<configT7>>, <<configT8>> times begin simultaneously, on as many resources as required. Tasks T4, T5, T6, T7 and T8 are then executed while observing the validations of the precedence constraints.

The method continues in this way, level by level, with the processing of a new level of tasks, beginning as soon as all the tasks of the previous level have been configured.

Figure 4:
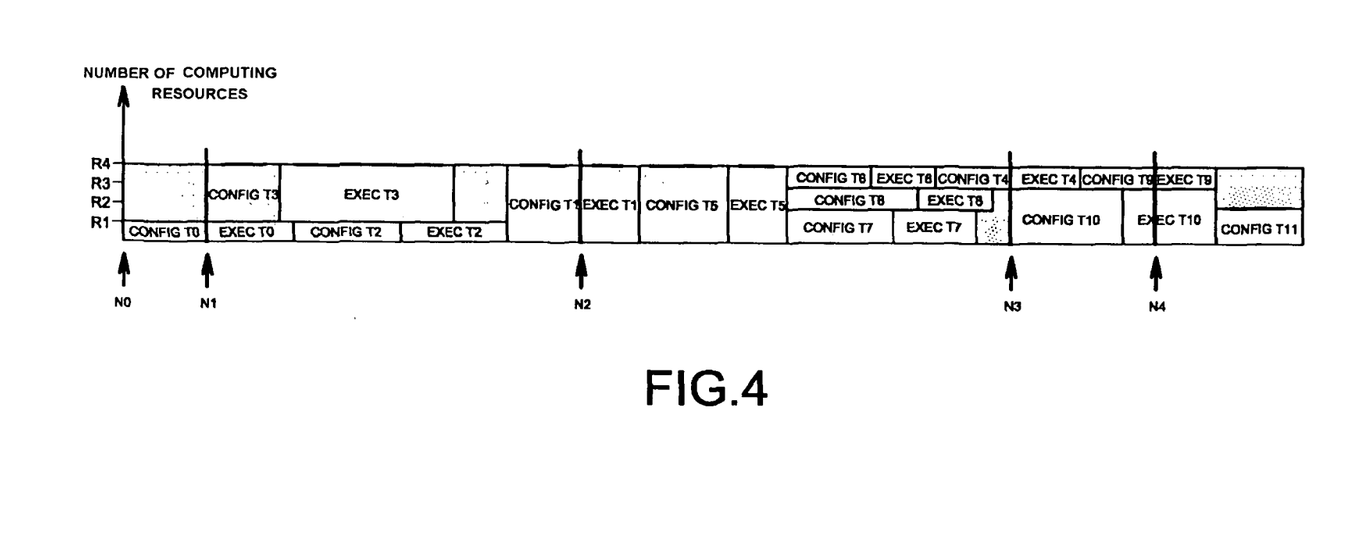
FIG. 4 illustrates a scheduling example for processing tasks according to the invention.

Within the scope of the invention, the number of resources is limited and an order of priority should be established for assigning the processing of the tasks to the resources. FIG. 4 illustrates the scheduling method of the invention, as a non-limiting example, in the case when the number of resources is limited to four.

A level of tasks begins as soon as all the tasks of the previous level have been configured. Configuration of the tasks of level N1 therefore begins when configuration of task T0 is completed, i.e., when task T0 begins its execution. As the task T0 is executing on a single resource and the total number of available resources is equal to four, the number of available resources is equal to three. It is therefore the configuration of task T3 which begins, as the latter is the task which uses the most (three) resources within the limits of the three available resources. Execution of task T3 then follows the configuration of task T3 and when execution of task T0 is completed, the resource which becomes available is used for configuring task T2 to which follows execution of task T2. As long as task T2 is executing, only three resources are available. Configuration of task Ti which requires four resources can therefore not be carried out. As soon as task T2 has completed its execution, configuration of task T1 may then begin. At the end of the configuration of task T1, as all the tasks of level N1 have been configured, level N2 formed with tasks T4, T5, T6, T7 and T8 is then formed.

The method continues in this way, level by level, a new level of tasks to be processed beginning as soon as all the tasks of the previous level have been configured.

Figure 5:
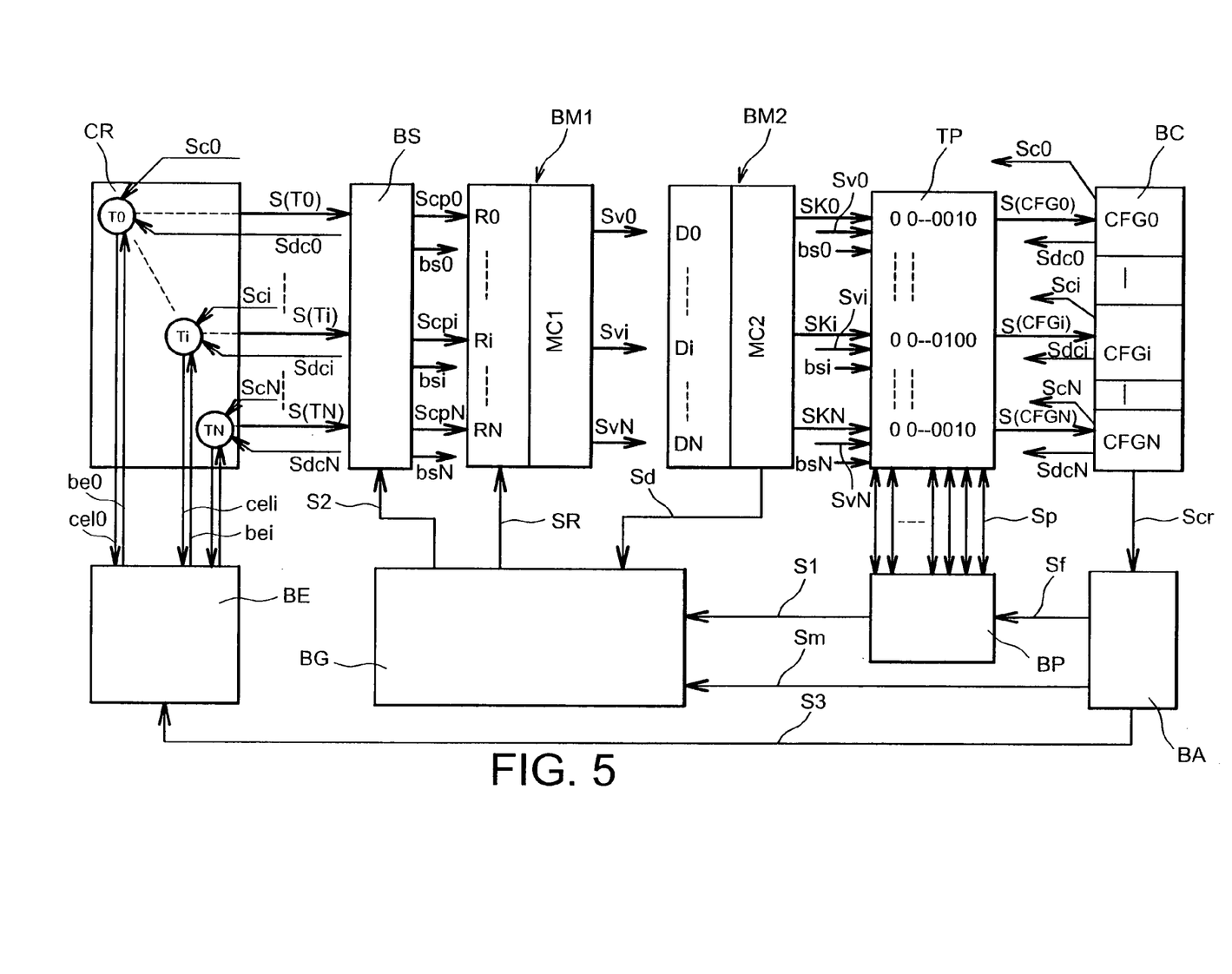
FIG. 5 illustrates a scheduling device for processing tasks according to the invention.

A device for applying the task scheduling method according to the preferential embodiment of the invention is illustrated in FIG. 5.

This device comprises a reconfigurable component suitable for control CR which contains the set of tasks to be executed, a level selection block BS with which at a given instant, all the tasks of a same level may be selected, a first memory block BM1 containing information representative of the number of resources required for executing each task, and first comparison means, a second memory block BM2 which comprises information representative of the characteristic quantities of each task (preferentially the task processing times) and second comparison means, a priority table TP which dynamically indicates an order of priority in which the tasks should be processed, a configuration block BC which contains the configuration data required for configuring resources associated with each task, a task assignment block BA with the function i.a. of configuring the tasks, a priority evaluation block Bp which indicates the position of the task which has priority in the priority table TP, a resource handling block BG and a task execution block BE.

The reconfigurable component suitable for control CR preferentially is a reconfigurable component such as the one described in the French Patent published under the number 2,795,840 and delivered on Aug. 31, 2001. It consists of N+1 cells Ci (i=0, 1, 2, ..., N) representing the N+1 states of the application graph and of a reconfigurable interconnection network for connecting the different states to each other. Each cell Ci contains the task Ti. Two tokens travel through the application graph depending on validations of the precedence constraints of the tasks. A first token, called a <<configuration token>>, travels through the interconnection network in order to activate configuration of the tasks, as the configuration and the precedence constraints change over time. The second token, called the <<execution token>>, travels through the interconnection network in order to activate execution of the tasks, as the executions and precedence constraints change over time. A token is the representation of a validation signal propagating from cells to cells according to the precedence constraints and according to the validation of these constraints. A cell propagates its token to its child cells if the precedence constraint is validated. This mechanism is known per se within the scope of graph theory and more particularly within the scope of Petri graph theory [cf. bibliographic reference PETE81].

Generally a parent task transmits a configuration token to its child tasks as soon as it has received an execution token. This arrangement does not concern the source task(s) of an application graph which do not depend on any parent task and may consequently transmit a configuration token to their child tasks as soon as their configuration begins. At the beginning of the execution of the application graph, a source task (task T0 in the selected example) contains a configuration token and an execution token.

The data contained in the blocks BM1, BM2, TP and BC are arranged as N+1 lines of data so that each data line correspond to a different task. As a result:
the data Ri (i=0, 1, 2, ..., N) representative of the number of resources required for executing each task are arranged in the memory block BM1 as N+1 data lines,
the data Di (i=0, 1, 2, ..., N) representative of the processing times of the tasks contained in the memory block BM2 are arranged as N+1 data lines,
the priority table TP consists of N+1 lines of shift registers, the shift registers of the line of rank i (i=0, 1, 2, ..., N) containing a set of binary data representative of the priority rank of task Ti,
the configuration data CFGi (i=0, 1, 2, ..., N) required for configuring the resources Ri are arranged as N+1 data lines.

Operation of the device illustrated in FIG. 5 will now be described with reference to the application graph of FIG. 1.

In the initial state, before the beginning of the processing of the tasks, the shift registers of all the lines of the priority table are in the same state. Thus, for example, all the registers of a same line comprise the binary value <<0>>, except for the shift register located at one end of the line, for example the right end (see figure), which comprises the binary value <<1>> (high logic level).

At the beginning of the processing of the application graph, the cell C0 of the graph which contains the task T0 contains a configuration token and an execution token. Task T0 is then the task having priority, to be processed, as it is the only one forming the level of tasks to be executed. On the memory line which corresponds to task T0, the rightmost high logic level is then left-shifted under the action of the signal bs0 delivered by the block BS. The resources required for executing the task T0 are then configured by means of the assignment block BA. For this purpose, the CFG0 data required for configuring the resources relatively to task T0 are transmitted, via a signal Scr, from the configuration block BC to the assignment block BA. A signal Sc0 which indicates that configuration of the resources associated with task T0 is beginning, is also transmitted, via blocks TP, BM2, BM1, BS, from the configuration block BC to the cell C0 which contains the task T0. Upon receiving the signal Sc0, the configuration token contained by cell C0 is allowed to propagate to all the cells which contain the tasks of the next level, i.e., cells C1, C2, C3 which contain the tasks T1, T2, T3 because C0 contains an execution token. The cells C1, C2, C3 then each transmit a signal for task validation (respective S(T1), S(T2), S(T3) signals) transmitted to the selection block BS.

When the configuration of the resources associated with task T0 is completed, the assignment block BA delivers a resource end-of-configuration signal Sf to the priority evaluation block BP. The block BP then delivers to the priority table TP a signal Sp which controls the shifting of the rightmost high logic level on the memory line which corresponds to task T0.

The shift registers of the priority table TP are then found in a state identical with the initial state (all the high logic levels are entirely found on the right in the priority table TP). The priority evaluation block BP then transmits to the resource handling blocks BG a signal S1 which indicates that the priority table TP has returned to its initial state. Under the action of signal S1, the resource handling block BG delivers a control signal S2 to the selection block BS which then stores the tasks corresponding to the signals validated earlier S(T1), S(T2), S(T3). The level of tasks T1, T2, T3 is then formed as a new level of tasks to be executed. A left shift of each line validated by the block BS is then carried out in the priority table TP by means of the corresponding bsi signals.

An initialization phase then begins. The initialization phase consists of initializing the priority table TP. At the beginning of the initialization, the memory cells of the rightmost shift registers are at high logic levels, except for the memory cells which correspond to the tasks validated by the selection block BS. The level of tasks to be executed now consists of tasks T1, T2, T3. With the signals Scpi generated by the selection block BS, the memory block BM1 may be informed on the tasks to be compared. The data D1, D2, D3 representing the respective processing times of tasks T1, T2, T3 are then compared with each other by second comparison means MC2 integrated into the BM2 block. The high logic levels contained in the shift registers of the priority table TP are then all the more left-shifted as the times of the tasks which correspond to them are longer. The shifts are performed by the Ski signals.

At the end of the comparisons of the processing times and of the shifts of the high logic levels which result from this, an end-of-comparison signal Sd is delivered by the BM2 block to the handling block BG. Upon receiving the Sd signal, the handling block BG delivers a signal. SR representative of the number of available computing resources. The signal SR representative of the number of available computing resources is then compared with the data Ri selected by signals Scpi, and contained in the first memory block BM1 by the first comparison means MC1. If memory lines of the BM1 block contain Ri data representing a value identical with the value represented by the signal SR, Svi signals are then sent to the priority table TP. If no memory line contains data representing an identical value, the value represented by the signal SR is decremented until one Ri datum or Ri data are identical with the value represented by the signal SR.

The line of rank i selected by the Svi signal and which corresponds to the shift register which contains the leftmost high logic level, is then the priority line and a configuration validation signal S(CFGi) which corresponds to this line, is transmitted to the configuration block BC. Detection of the priority line is performed by the priority evaluation block BP, under the action of the priority signals Sp. The contents of the line of the configuration block BC validated by the signal S(CFGi) is then sent to the task assignment block BA, via signal Scr. A signal Sdci is then also sent to the CR component in order to allow propagation of the configuration token. The configuration token is however only propagated if the cell has an execution token. If the task T1 is the task using the largest number of resources or the task with the longest execution time (in the case of the application graph of FIG. 1, task T1 uses the largest number of resources), the configuration CFG1 is sent to the task assignment block BA. Upon receiving the configuration CFG1, via the signal Scr delivered by the block BC, the BA block then assigns the task T1 to the available resources. When the configuration of the task is completed, a task end-of-configuration signal SF is delivered by the assignment block BA to the priority evaluation block BP. Signal SF controls the rightmost shifting of the contents of the priority line selected earlier (in this case the line of task T1), via the signal SP, in the priority table TP. Further, the location of the configured tasks on the resources is provided to the execution block BE via signal S3. A signal Sm for requesting an update of the number of available resources is then delivered by the assignment block BA and transmitted to the resource handling block BG.

The processing of all the tasks of the level of tasks to be executed is thus executed until the last task of the task level. When all the high logic levels are entirely found on the right in the priority table TP, this means that processing of the task level is completed and a signal S1 is transmitted to the handling block BG in order to allow a new execution level to be defined via signal S2. The task scheduling method continues in this way, task level by task level.

The first task to be executed of the task level upon initialization includes a configuration token and an execution token. Thus, its execution begins as soon as its configuration is completed. The corresponding cell in the reconfigurable component suitable for control CR begins its execution by sending a signal ceil to the task execution block BE. The task execution block BE which is aware of the location of the task to be executed which was configured beforehand on the computing resources, then executes the task. At the end of the execution of the task, a signal bei is sent to the corresponding cell in the reconfigurable component suitable for the control CR. This signal has the effect of propagating the execution token to all of its child cells according to the precedence constraints. In the described example, the cell corresponding to the task T0 propagates its token to the cells associated with tasks T1, T2, T3. Upon receiving the execution token, the cells T1, T2, T3 may propagate their configuration tokens to their child cells T4, T5, T6, T7, T8 and begin their executions as soon as their configurations are completed. The tasks T4, T5, T6, T7, T8 may in turn request their configuration and be executed.

In order to carry out the scheduling of the tasks on a heterogeneous system, it is sufficient to integrate into the hardware solution, as many BM1 blocks as there are different resource types. Task allocation is then performed by taking into account the number of free resources for every type of resources present in the system.

According to the preferential embodiment of the invention described above, the tasks are contained in a reconfigurable component suitable for control and the means for establishing the order of priority comprise a set of shift registers containing binary data. According to other embodiments of the invention, the component is not a component suitable for control but a simple component containing the tasks to be processed. Also, the means for establishing an order of priority do not comprise any shift registers but adders capable of incrementing their contents depending on the results of the comparison, incrementation of an adder then being the equivalent of shifting a shift register.

Figure 6A:
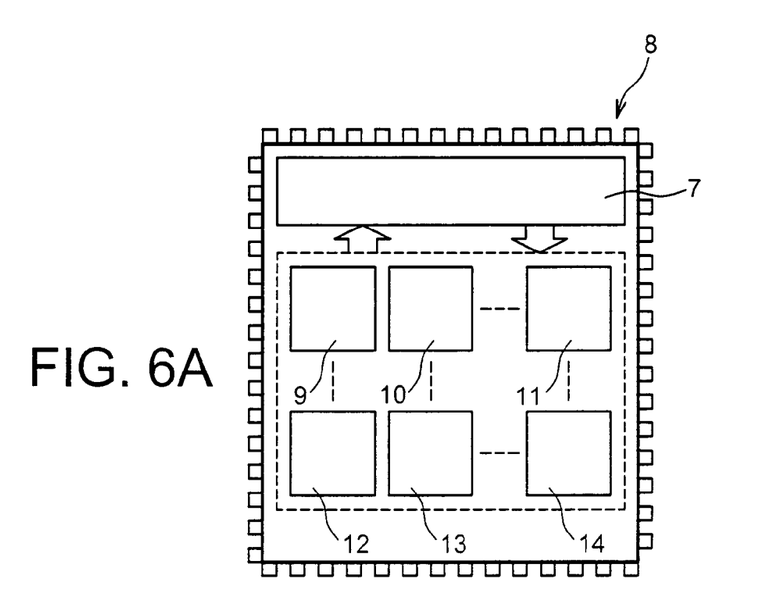
FIGS. 6A-6C illustrate examples of application of the task processing scheduling device according to the invention.
Figure 6B:
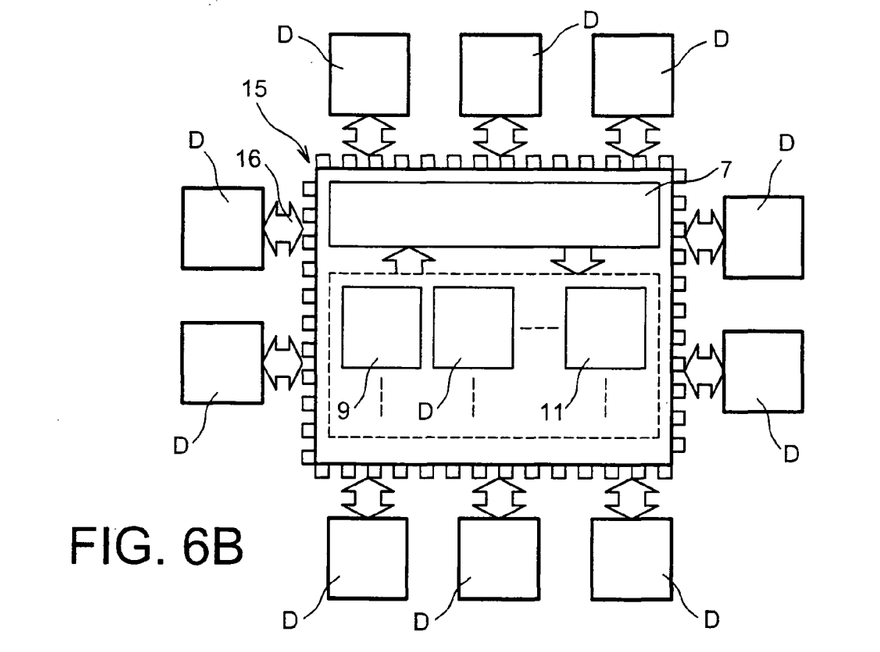
Figure 6C:
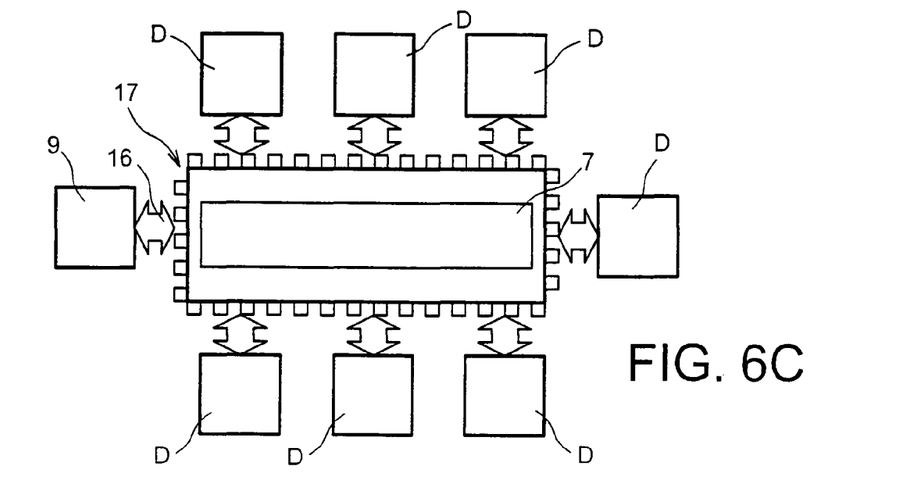

FIGS. 6A-6C illustrate examples of applying the task processing scheduling device according to the invention. The computing resources handled by the scheduling device may be identical or of different natures (heterogeneous resources). With these components it is possible to meet strong demands for performance and flexibility associated with on-board applications. The invention offers the possibility of linking together on a same platform or in a more distributed way, components for which the characteristics are complementary or opposite in order to adapt the performance, consumption, flexibility and surface area level, depending on the needs of the application.

FIG. 6A illustrates a first exemplary component with SoC technology which integrates a task processing scheduling device according to the invention.

In addition to the scheduling device 7, the component 8 comprises a microprocessor 9, a CDMA (Code Division Multiple Access) specialized computing block 10, a dedicated and proprietary block 11 called IP (Intellectual Property), a reconfigurable computing block 12, a reconfigurable and proprietary computing block 13 and a MPEG (Motion Picture Expert Group) specialized computing block 14.

FIG. 6B illustrates a second exemplary component with SoC technology which integrates a scheduling device according to the invention. The component 15 comprises different heterogeneous entities, as well as a set of sensors D. The device of the invention also handles sensors D located outside the component and connected to the latter by means of a suitable interface 16. The heterogeneous resources here are microprocessors 9 and dedicated and proprietary blocks 11.

FIG. 6C illustrates a third exemplary component with SoC technology which integrates a scheduling device according to the invention. The set of entities handled by the inventive device here is outside the component 17 and controlled by the device of the invention via a suitable interface 16.

BIBLIOGRAPHIC REFERENCES

[BLAZ86] J. Blazewicz, M. Drabowski, and Weglarz. "Scheduling Multiprocessor Tasks to Minimize Schedule Length". IEEE Transactions on Computers, 35(5):389-393, May 1989.

[JANS99] K. Jansen and L. Porkolab. "Improved Approximation Schemes for Scheduling Unrelated Parallel Machines". In Annual ACM Symposium on Theory of Computing (STOC), May 1999.

[BAER73] J. L. Baer. "A Survey of Some Theoretical Aspects of Multiprocessing". ACM Computing Surveys, 5(1):31-80, March 1973.

[BAKE81] B. S. Baker, D. J. Brown, and H. P. Katseff. "A 5/4 Algorithm for Two-Dimensional Packing". Journal of Algorithms, 2(4):348-368, June 1981

[TOPC02] H. Topcuoglu, S. Hariri, and M-Y. Wu. "Performance and Low-Complexity Task Scheduling for Heterogeneous Computing". IEEE Transactions on Parallel and Distributed Systems, 13(3):260-274, March 2002.

[BELK90] K. Belkhale and P. Banerjee. "Approximate Scheduling Algorithms for the Partitionable Independent Task Scheduling Problem". In the 1990 International Conference of Parallel Processing (ICPP). August 1990.

[LI00] K. Li and Y. Pan. "Probabilistic Analysis of Scheduling Precedence Constrained Parallel Tasks on Multicomputers with Contiguous Processor Allocation". IEEE Transactions on Computer, 49(10):1021-1030, October 2000.

[IBAR88] T. Ibaraki and N. Katoh. "Resource Allocation Problems: Algorithmic Approaches". The MIT Press, Cambridge, USA, 1988.

[PETE81] James L. Peterson. "Petri net theory and the modelling of systems". Practice Hall, ISBN: 0136619835.

The invention claimed is:

1. A scheduling method for processing tasks by means of hardware components (a reconfigurable component suitable for control (CR), a level selection block (BS), a first memory block (BM1), a second memory block (BM2), a priority table (TP), a configuration block (BC), a task assignment block (BA), a resource handling block (BG), a task execution block (BE)), the method comprising, for each task, a step for configuring resources required for executing said each task and a step for executing said each task on the thereby configured resources, an order of precedence in which the tasks should be executed being known before applying the method, characterized in that it comprises successively:

a selection (1) of said tasks in accordance with said order of precedence so as to define at least one level of independent tasks to be processed, a level of independent tasks of rank G comprising all the tasks for which the beginning of the execution directly depends on the end of the execution of the tasks of a preceding level of independent tasks of rank G-1, a step for sorting (2) out the tasks of said one level of independent tasks depending, on the one hand, on the number of resources required for processing each task of said one level and, on the other hand, on a quantity characteristic of said each task of said one level, in order to define an order of priority in the processing of the tasks of said one level, an evaluation (3) of the number of available resources required for processing the tasks of said one level of independent tasks, an assignment (4) of the tasks of said one level of independent tasks to the available resources according to the order of priority, in accordance with the order of priority, a configuration of the available resources to which the tasks of said one level of independent tasks have been assigned, the available resources being configured in parallel on as many resources as required, and a step for executing the tasks of said one level of independent tasks on the thereby configured resources, the processing of tasks of a further level of independent tasks beginning as soon as the available resources to which the tasks of said one level of independent tasks have been assigned are configured, and wherein the sorting step comprises a first sorting according to the number of resources required for executing the tasks on the one hand, so that the tasks are processed according to a decreasing order of the number of resources required for their processing, and a second sorting according to the characteristic quantity of the tasks on the other hand, so that the tasks are processed according to an increasing or decreasing order of their characteristic quantity, wherein either the first sorting precedes the second sorting, the second sorting being applied as soon as the number of resources required for processing several tasks is identical for said several tasks, or the second sorting precedes the first sorting, the first sorting being applied as soon as the characteristic quantity of the tasks relative to several tasks is identical for said several tasks.

2. The scheduling method for processing tasks according to claim 1, characterized in that the quantity characteristic of the tasks is the processing time of the tasks, or the configuration time of the resources required for executing the tasks, or the execution time of the tasks, or a time which is left to a task for executing depending on an execution time constraint associated with the tasks, or the processing, configuration or execution time of one or several tasks of upper rank in the order of precedence of the tasks, or a latest end date for configuring the tasks or executing the tasks, or an earliest or latest start date for configuring or executing one or several tasks of upper rank in the order or precedence of the tasks, or a time depending on a periodicity relative to one or several tasks, or a time depending on the whole or part of the characteristic quantities listed above.

3. The scheduling method for processing tasks according to claim 1, characterized in that the quantity characteristic of the tasks is a passband width useful for executing the tasks, or an arrival rate of data processed by the tasks, or a number of useful resources for storing or communicating data processed by the tasks, or a cost for communicating with other tasks or with resources shared among the tasks, or a power consumption generated by the processing of the tasks, or a piece of information which measures the complexity of the operations associated with the execution of the tasks, or a piece of information which measures the regularity of an algorithm associated with the execution of the tasks, or a piece of information which measures the parallelism of task execution, or a piece of information which measures a priority independent of the tasks and imposed by a user in the case of multi-user use, or a function of the whole or part of characteristic quantities listed above.

4. The scheduling method for processing tasks according to claim 1, characterized in that the quantity characteristic of the tasks is a piece of information relating to the position of the tasks in an application graph.

5. The scheduling method for processing tasks according to claim 4, characterized in that the piece of information relating to the position of the tasks in an application graph is the time which is left to the tasks for executing before the end of a time constraint imposed on the processing time of the application graph, or the largest number of tasks which remain to be processed before the end of the application graph, or the largest number of tasks of upper rank in the order of precedence of the tasks, or the sum of the execution times of the tasks of upper rank in the order of precedence of the tasks, or a function of the whole or part of the quantities listed above.

6. The scheduling method for processing tasks according to claim 1, characterized in that the assignment of the available resources depending on the order of priority is dynamically repeated until all the tasks of the task level are processed.

7. The scheduling method for processing tasks according to claim 1, characterized in that it comprises a step for rejecting the processing of one or more tasks of said one level of independent tasks to be processed in order to allow degraded operation.

8. A method for processing tasks, the processing of a task comprising a step for configuring resources required for executing the task and a step for executing the task on thereby configured resources, an order of precedence in which the tasks should be executed being known before applying the method, characterized in that it comprises a scheduling method for processing the tasks according to claim 1 and in that the configuration of the resources and the execution of the tasks are activated by a configuration token and by an execution token, respectively.

* * * * *

UNITED STATES PATENT AND TRADEMARK OFFICE
CERTIFICATE OF CORRECTION

PATENT NO. : 8,522,243 B2  Page 1 of 1
APPLICATION NO. : 11/658935
DATED : August 27, 2013
INVENTOR(S) : Ventroux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1462 days.

Signed and Sealed this

Fifteenth Day of September, 2015

Michelle K. Lee
*Director of the United States Patent and Trademark Office*